(12) United States Patent
Ageno et al.

(10) Patent No.: US 10,288,285 B2
(45) Date of Patent: May 14, 2019

(54) SELF-REGENERATING INDUSTRIAL BURNER AND INDUSTRIAL FURNACE FOR CARRYING OUT SELF-REGENERATING COMBUSTION PROCESSES

(71) Applicant: TENOVA S.p.A., Milan (IT)

(72) Inventors: Marco Ageno, Genoa (IT); Toni Rossi, Genoa (IT)

(73) Assignee: TENOVA S.p.A., Milan (IT)

(*) Notice: Subject to any disclaimer, the term of this patent is extended or adjusted under 35 U.S.C. 154(b) by 0 days.

(21) Appl. No.: 15/030,489

(22) PCT Filed: Nov. 20, 2014

(86) PCT No.: PCT/IB2014/066200
§ 371 (c)(1),
(2) Date: Apr. 19, 2016

(87) PCT Pub. No.: WO2015/075666
PCT Pub. Date: May 28, 2015

(65) Prior Publication Data
US 2016/0245514 A1    Aug. 25, 2016

(30) Foreign Application Priority Data

Nov. 20, 2013 (IT) .............................. MI2013A1931

(51) Int. Cl.
*F23L 15/02* (2006.01)
*F23D 14/48* (2006.01)
(Continued)

(52) U.S. Cl.
CPC .............. *F23L 15/02* (2013.01); *F23D 14/48* (2013.01); *F23D 14/66* (2013.01); *F23C 3/002* (2013.01);
(Continued)

(58) Field of Classification Search
CPC .......... F23L 15/02; F23D 14/48; F23D 14/66; F23D 14/22; F23D 14/58;
(Continued)

(56) References Cited

U.S. PATENT DOCUMENTS 2,148,466 A * 2/1939 Hepburn ................. F23C 3/002
126/116 R
2,632,501 A * 3/1953 Clark ...................... F23D 11/00
110/104 R
(Continued)

FOREIGN PATENT DOCUMENTS

EP    0 463 218 A1    1/1992
EP    0 698 764 A2    2/1996
(Continued)

OTHER PUBLICATIONS

International Search Report dated Mar. 23, 2015 in corresponding PCT/IB2014/066200.
(Continued)

*Primary Examiner* — Gregory L Huson
*Assistant Examiner* — Daniel E Namay
(74) *Attorney, Agent, or Firm* — Oblon, McClelland, Maier & Neustadt, L.L.P.

(57) ABSTRACT

A self-regenerating industrial burner including a head with which at least one first fuel injection nozzle, associable at an inlet with a fuel supplying group, and at least one pair of second nozzles, that can be alternatively and selectively passed through by combustion air and combustion exhaust gases, are associated; a tubular body open at opposite ends, arranged at a front part of the head and coaxial to the at least one first nozzle with an end close to the face of the head at which the first nozzle and the at least one pair of second nozzles protrude and the opposite end distant from the face. Each second nozzle includes at least one first tubular por- (Continued)

tion, radially lying outside the tubular body and defining at an end at least one first port, alternatively for exit of the combustion air and for inlet of the combustion exhaust gases.

19 Claims, 13 Drawing Sheets

(51) Int. Cl.
*F23D 14/66* (2006.01)
*F23D 14/58* (2006.01)
*F23C 3/00* (2006.01)
*F23N 3/00* (2006.01)

(52) U.S. Cl.
CPC ............ *F23C 2900/03009* (2013.01); *F23C 2900/99001* (2013.01); *F23D 2203/002* (2013.01); *Y02E 20/342* (2013.01); *Y02E 20/348* (2013.01)

(58) Field of Classification Search
CPC ......... F23D 2203/002; F23D 2203/007; F23C 2900/99001; F23C 2900/03009; F23C 3/002; F23C 7/002; F23C 3/00; F23N 3/00; Y02E 20/342; Y02E 20/348
USPC ...................................... 431/159, 162, 187, 8
IPC ............ F23L 15/02; F23D 14/48,14/58, 14/66; F23C 3/00; F23N 3/00
See application file for complete search history.

(56) References Cited

U.S. PATENT DOCUMENTS

| | | | | |
|---|---|---|---|---|
| 5,049,066 A * | 9/1991 | Kaiya | ................... | F23D 14/00 431/187 |
| 5,154,599 A | 10/1992 | Wunning | | |
| 5,201,650 A * | 4/1993 | Johnson | ................... | F23C 6/042 431/115 |
| 5,275,554 A * | 1/1994 | Faulkner | ................... | F23C 1/08 431/115 |
| 5,458,481 A * | 10/1995 | Surbey | ................... | F23C 9/006 431/115 |
| 5,628,629 A | 5/1997 | Mitani et al. | | |
| 6,033,208 A | 3/2000 | Wunning | | |
| 6,098,407 A * | 8/2000 | Korzendorfer | ......... | F23C 7/002 60/737 |
| 6,178,752 B1 * | 1/2001 | Morford | ................. | F23C 7/002 239/403 |
| 6,250,915 B1 * | 6/2001 | Satchell, Jr. | .......... | C03B 5/2353 431/187 |
| 6,363,746 B1 * | 4/2002 | Wei | ................... | C03B 37/0142 239/416.5 |
| 6,638,058 B1 * | 10/2003 | Mainusch | ............... | F23D 14/48 126/91 A |
| 7,270,539 B1 * | 9/2007 | Sujata | .................... | F23G 7/008 110/238 |
| 8,007,273 B2 * | 8/2011 | Ruck | ...................... | F23C 7/002 431/8 |
| 8,353,698 B2 * | 1/2013 | Moberg | ................. | B01D 53/56 239/132.3 |
| 8,920,160 B2 * | 12/2014 | Mozzi | .................... | F23C 6/047 431/278 |
| 9,416,965 B2 * | 8/2016 | Wieck | .................... | F23D 14/22 |
| 2003/0054301 A1 * | 3/2003 | Borders | ................. | F23D 14/22 431/8 |
| 2004/0187526 A1 * | 9/2004 | Shirota | ............... | C03B 19/1423 65/531 |
| 2005/0048426 A1 * | 3/2005 | Tatsumi | .................... | F23C 3/00 431/13 |
| 2006/0275724 A1 * | 12/2006 | Joshi | ........................ | F23C 5/28 431/181 |
| 2007/0037106 A1 * | 2/2007 | Kobayashi | ............. | F23D 14/22 431/8 |
| 2007/0141519 A1 | 6/2007 | Lauer | | |
| 2007/0157617 A1 * | 7/2007 | von der Bank | ....... | F23D 11/107 60/743 |
| 2008/0293002 A1 * | 11/2008 | Lifshits | .................. | F23C 6/047 431/116 |
| 2010/0285415 A1 * | 11/2010 | Bottcher | ................. | F23D 11/36 431/159 |
| 2010/0287939 A1 * | 11/2010 | Cornwell | ................ | F23C 7/002 60/748 |
| 2012/0006157 A1 * | 1/2012 | Gautam | ................. | C22B 7/003 75/612 |
| 2013/0048539 A1 * | 2/2013 | Salazar | .................... | B01J 19/26 208/106 |

FOREIGN PATENT DOCUMENTS

| | | | | |
|---|---|---|---|---|
| EP | 0 715 123 A2 | 6/1996 | | |
| EP | 0 903 539 B1 | 5/2003 | | |
| EP | 1 524 473 A1 | 4/2005 | | |
| EP | 1995516 A1 * | 11/2008 | ............ | F23D 14/66 |
| JP | 06074449 A * | 3/1994 | | |
| JP | 8-152104 | 6/1996 | | |
| JP | 2004-205113 | 7/2004 | | |
| JP | 2010266193 A * | 11/2010 | ............. | F23C 7/002 |
| RU | 2 082 915 C1 | 6/1997 | | |

OTHER PUBLICATIONS

Combined Office Action and Search Report dated Mar. 21, 2018 in Russian Patent Application No. 2016119146 (with English language translation), 25 pages.

* cited by examiner

SELF-REGENERATING INDUSTRIAL BURNER AND INDUSTRIAL FURNACE FOR CARRYING OUT SELF-REGENERATING COMBUSTION PROCESSES

The present invention refers to an industrial burner for carrying out self-regenerating combustion processes also in the flame mode, more specifically, the present invention refers to an industrial burner of the so-called "self-regenerating" type.

The present invention in addition refers to an industrial furnace, in particular an industrial furnace for the heat treatment of products, in particular semi-finished products and iron and steel products, metal and inorganic materials, comprising such an industrial burner for carrying out self-regenerating combustion processes also in the flame mode.

The present invention also refers to a method for controlling a self-regenerating industrial burner for carrying out self-regenerating combustion processes also in the flame mode.

The present invention can be applied to all industrial heating processes or, more generally, heat treatment processes carried out in furnaces and for which a high pre-heating efficiency of the combustion air is required and during the course of which the process temperature is relatively low (for example of the order of 450° C.) or in any case less than the self-ignition temperature of the fuel at least for most of the process time.

Industrial burners are known that are structured for recovering the heat of the combustion fumes in order to preheat the combustion air before it is mixed with the fuel.

Such burners are capable of preheating the combustion air up to temperatures that can be below the temperature inside the furnace by about 100° C.

There exist, in particular, the so-called "regenerative burners", each of which is equipped with a heat storage element alternatively crossed by the combustion fumes and by the combustion air.

These "regenerating burners" always work in pairs, alternating the combustion step with the suction step of the combustion fumes. For each pair, a burner acts as an actual burner, using combustion air that is preheated while passing through the respective heat storage element (wherein heat has been stored during the previous operating cycle), and the other burner acts as aspirator or chimney, storing in the respective heat storage element the heat of the combustion fumes that are sucked through it. At predetermined time intervals the operation of the two burners of each pair is inverted.

Burners of the so-called "self-regenerating" types are also known, which are each equipped with a pair of heat storage elements and each operate simultaneously as an actual burner and as an aspirator or chimney for the combustion fumes, alternating the flow of the inletting combustion air and of the exiting combustion fumes between own two heat storage elements.

One of the main problems that arises in the operation of "self-regenerating" burners is the suction of the unburnt substances (in particular, carbon monoxide CO) coming from the flame.

This problem is usually solved by making the burner operate in the diluted or flameless combustion mode, which allows the flame to be detached and moved away from the burner itself and, therefore, allows minimizing the possibility of sucking unburnt substances close to it.

This operating mode is schematically shown in the attached FIG. 1, which schematically represents the diffusor 1 of a "self-regenerating" burner of the known type applied to a combustion chamber C. The diffusor 1 is provided with a first central fuel injection nozzle 2 and with a pair of second nozzles 3 and 4 arranged on a circumference centred in the first nozzle 2 and alternatively and selectively passed through by the combustion air and by the combustion fumes (in FIG. 1, the second nozzle 3 is shown in the operation mode of injection of combustion air and the second nozzle 4 is shown in the operation mode as aspirator of the combustion fumes, as schematically represented by the arrows). For the sake of simplicity of representation the heat storage elements associated with the two second nozzles 3 and 4 are not represented, nor is the switching device of the flows between them, which must however be considered to be present.

The combustion air and the combustion gas are injected into the combustion chamber C at high speed (of the order of 100 m/s), so as not to generate a flame anchored to the diffusor 1, instead a diluted combustion in an area Z1 that is advanced with respect to the diffusor 1. This allows the combustion area Z1 to be separated from the area Z2 at which the combustion fumes are sucked from the inside of the combustion chamber C, thus minimising the suction of unburnt substances outwards.

As known, in order to be able to stably carry out a flameless combustion it is necessary for the temperature inside the combustion chamber C to be above the self-ignition temperature of the fuel by a value such as to avoid even possible risks of explosion. If, for example, the fuel is natural gas, the temperature threshold above which it is possible to stably carry out a flameless combustion is about 800° C.

The known "self-regenerating" burners, therefore, are usually equipped with a device 5 for generating a pilot flame F, as schematically shown in the attached FIG. 2 (diagram on the left). The device 5 comprises further nozzles for injecting cold combustion air, which is used for generating a pilot flame F anchored to the diffusor 1. The pilot flame F serves to bring the temperature inside the combustion chamber C above 800° C., upon reaching which the device 5 is deactivated, being it possible to make the burner operate in the flameless operating mode with the preheating of the combustion air carried out by the heat storage elements associated with the second nozzles 3 and 4 (FIG. 2, diagram on the right).

The "self-regenerating" burner is therefore capable of preheating the combustion air with high pre-heating efficiency just when the combustion chamber C is above 800° C.

In fact, in order to generate the pilot flame F and to keep it until a temperature above the self-ignition temperature of the fuel is reached inside the combustion chamber, cold combustion air is used, so that the preheating efficiency of the combustion air falls to 0 for temperatures inside the combustion chamber below such a temperature (800° C. for natural gas).

This problem is partially overcome through "self-regenerating" burners that, in a certain temperature range, in any case below the self-ignition temperature of the fuel (for natural gas in the temperature range comprised between 500° C. and 800° C.), are capable of operating in the intermediate mode, in which a fraction of the combustion air, typically half of it, is preheated and the remaining fraction is used cold by the pilot device 5 for generating a pilot flame F.

This operating mode is schematically represented in FIG. 3 referring to the prior art, where the first diagram shows the "self-regenerating" burner in the operating mode with pilot flame (the temperature inside the combustion chamber C being below 500° C.), the second diagram shows the burner in the intermediate operating mode described above (the temperature inside the combustion chamber C being comprised between 500° C. and 800° C.) and the third diagram shows the burner in the flameless operating mode with preheating of all of the combustion air.

However, in this case as well, the use of cold air for carrying out the pilot flame penalizes the overall efficiency of the preheating of the combustion air.

The attached FIG. 4 contains a graph that shows the preheating efficiency values of the combustion air (i.e. the ratio between the preheating temperature of the combustion air and the temperature inside the combustion chamber) typical of a "self-regenerating" burner of the known type as the temperature inside the combustion chamber varies in the different operating modes of the "self-regenerating" burner as described above and operating with natural gas.

It is noted that above 800° C. the preheating efficiency is about 80%, whereas below 800° C. the efficiency falls to 0 or, alternatively, halves in the temperature range between 500 and 800° C.

The use of cold air for generating a pilot flame thus greatly limits the use of the "self-regenerating" burner that, therefore, only finds application in furnaces with process temperature above the self-ignition temperature of the fuel (equal to about 800° C. for natural gas).

There exist, however, several industrial heat treatment furnaces where the process temperature is much less than the self-ignition temperature of the fuel, for example it is comprised between 450° C. and 700° C. (on average equal to 600° C.), and, therefore, always below the flameless combustion threshold. In other cases, on the other hand, even if the treatment temperature can exceed the self-ignition temperature of the fuel, for example being comprised between 700° C. and 900° C., for most of the treatment time the treatment temperature remains below such a temperature (i.e. below 800° C. for natural gas).

In order to be able to extend the operation of a "self-regenerating" burner in the preheating mode of the combustion air even to temperatures inside the combustion chamber below the self-ignition temperature of the fuel (i.e. 800° C. for natural gas), it is necessary to be able to separate the area where the combustion takes place from the area at which the combustion fumes are sucked and, at the same time, it is necessary to produce a stable and anchored flame that does not extinguish due to the low temperature inside the combustion chamber and to the low percentage of oxygen present in the combustion fumes (usually not above 3% by volume).

For this purpose, solutions have been proposed such as for example the ones described in U.S. Pat. No. 5,628,629, in which the diffusor ("burner tile") has a central portion projecting with respect to the surface at which the openings for the inletting flow of the combustion air and for the exiting flow of the combustion fumes are defined and through which the fuel is injected. This central projection has the purpose of taking the area at which the pilot flame is generated away from the area at which the combustion fumes are sucked outwards, so as to reduce the amount of unburnt substances that can be sucked together with the combustion fumes.

Still according to what is described in U.S. Pat. No. 5,628,629 it is possible to arrange a combustion assistance cylinder at the front part of the central projecting portion of the diffusor. Such a cylinder surrounds and encloses inside it both the fuel injection nozzle, which is coaxial to the central projecting portion of the diffusor, and the openings for the flow of the combustion air and of the combustion fumes, which are arranged along a circumference that is concentric to the fuel injection nozzle and that lies inside the combustion assistance cylinder.

Such a configuration, as described in U.S. Pat. No. 5,628,629, allows the "self-regenerating" burner to operate even at low temperatures.

Even in this case, however, in order to stabilize the flame, a pilot device (of the type described for example in U.S. Pat. No. 6,079,976) is anyway present and generates a pilot flame fed with cold combustion air, with negative consequences on the preheating efficiency carried out by the burner.

A further solution has been proposed by U.S. Pat. No. 6,033,208, in which the two heat storage elements of the "self-regenerating" burner are arranged in two chambers coaxial to the fuel injection nozzles. This solution allows using the most inner chamber for generating the pilot flame, thus eliminating the need for a dedicated pilot device. Even in this case, however, it is necessary to produce a pilot flame with the use of cold combustion air to bring the temperature inside the combustion chamber above the self-ignition temperature (800° C.), above which the burner operates in the self-regenerating mode with preheating of the combustion air.

The "self-regenerating" burners of the known type, therefore, are capable of efficiently preheating the combustion air just when the temperature inside the combustion chamber is above the self-ignition temperature of the fuel and, therefore, just in the flameless combustion mode. Below such a temperature, they operate in the flame mode, for the generation of which at least one fraction of cold combustion air is always used, which penalizes the overall preheating efficiency.

Therefore, there is a need for an industrial burner of the "self-regenerating" type that, independently of the temperature inside the combustion chamber, is capable of generating a stable and anchored flame using for it just preheated combustion air, instead of cold combustion air.

In other words, there is a need for a "self-regenerating" industrial burner that is capable of operating in the flame mode as well, and not just in the flameless mode, preheating the totality of the combustion air and that is capable of keeping the level of unburnt substances (in particular CO) sucked together with the combustion fumes below the limits set by the current standards (typically less than 100 ppm).

The purpose of the present invention is, therefore, that of making a self-regenerating industrial burner and an industrial furnace for carrying out self-regenerating combustion processes that allow the combustion air to be preheated with high efficiency even when the temperature inside the combustion chamber is below the self-ignition temperature of the fuel.

A further purpose of the present invention is that of making a self-regenerating industrial burner and an industrial furnace for carrying out self-regenerating combustion processes that, whatever the temperature inside the combustion chamber be, allow a stable and anchored flame to be generated by using just preheated combustion air for it.

Yet another purpose of the present invention is that of making a self-regenerating industrial burner and an industrial furnace for carrying out self-regenerating combustion processes that, whatever the temperature inside the combustion chamber be, allow the suction of unburnt substances together with the combustion fumes to be avoided or in any case limited.

Yet another purpose of the present invention is that of providing a method for controlling a self-regenerating industrial burner applied to an industrial furnace for the heat treatment of products that allows the operation of such a burner for carrying out self-regenerating combustion processes to be controlled, whatever the temperature inside the combustion chamber be.

Another purpose of the present invention is that of making a self-regenerating industrial burner and an industrial furnace for carrying out self-regenerating combustion processes that are particularly simple and functional, with low costs.

These purposes according to the present invention are accomplished by making a self-regenerating industrial burner for carrying out self-regenerating combustion processes as outlined in claim 1.

These purposes according to the present invention are accomplished by making an industrial furnace for the heat treatment of products, in particular semi-finished products and iron and steel products, metal and inorganic materials, for carrying out self-regenerating combustion processes, as outlined in claim 14.

These purposes are also achieved through a method for controlling a self-regenerating industrial burner for carrying out self-regenerating combustion processes in industrial furnaces for the heat treatment of products, in particular semi-finished products and iron and steel products, metal and inorganic materials, as outlined in claim 15.

Further characteristics are provided for in the dependent claims.

The characteristics and advantages of a self-regenerating industrial burner and of an industrial furnace for carrying out self-regenerating combustion processes according to the present invention will become clearer from the following description, given as an example and not for limiting purposes, referred to the attached schematic drawings, in which:

FIGS. 1 to 4 schematically show the operating modes of "self-regenerating" burners according to the prior art;

FIG. 5 schematically and partially shows the basic structure of a self-regenerating industrial burner according to the present invention;

FIGS. 5A and 5B schematically show side elevation and front views of a detail of the self-regenerating industrial burner of FIG. 5;

FIG. 6 schematically shows a self-regenerating industrial burner according to the present invention;

FIG. 7 is a graph that shows the preheating efficiency values as a function of the temperature inside the combustion chamber of an industrial furnace of a self-regenerating industrial burner according to the present invention in comparison to those of a self-regenerating industrial burner according to the prior art;

FIG. 8 schematically shows a first alternative embodiment of the self-regenerating industrial burner according to the present invention with a detail on an enlarged scale alongside;

FIG. 9 schematically shows possible configurations of the far end of the second nozzles of the self-regenerating industrial burner according to the present invention alternatively passed through by the combustion air and by the combustion exhaust gases;

FIG. 10 schematically shows a second alternative embodiment of the self-regenerating industrial burner according to the present invention;

FIG. 11 schematically shows a third alternative embodiment of the self-regenerating industrial burner according to the present invention;

FIG. 12 schematically shows a fourth alternative embodiment of the self-regenerating industrial burner according to the present invention;

With reference to the attached FIGS. 5 to 16 a self-regenerating industrial burner according to the present invention applied to an industrial furnace 100 for the heat treatment of products, in particular semi-finished products and iron and steel products, metal and inorganic materials, has been wholly indicated with 10.

It is specified that the use in the following description and in the attached claims of adjectives such as "first", "second", "third" or similar is just made for clarity presentation purposes.

It is also specified that in the present description by "combustion air" it is meant to indicate comburent air or in any case a comburent that assists the combustion of a fuel, whereas by "combustion exhaust gases" it is meant to indicate the fumes produced by the combustion of the fuel.

By fuel it is meant to indicate a gaseous or liquid fuel and, in particular, natural gas.

Figure 6:
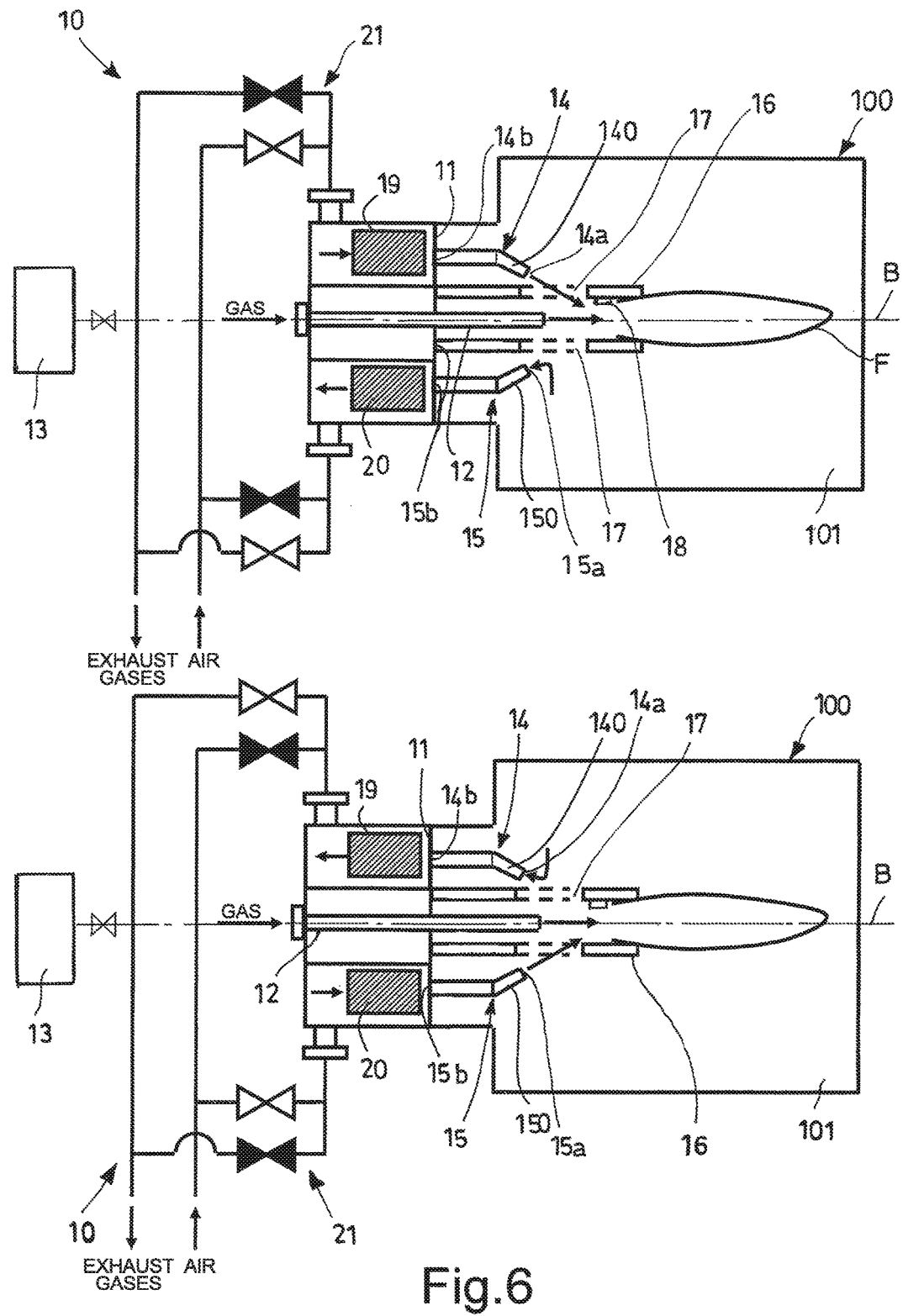

Furthermore, the attached figures only schematically show the self-regenerating industrial burner according to the present invention in different possible variants and the operating principle thereof; in particular, the sole FIG. 6 shows the self-regenerating industrial burner according to the present invention complete with the heat storage elements and the switching device for switching the combustion air and the combustion exhaust gases flows, which in any case have to be considered as being present in an industrial "self-regenerating" burner according to the present invention and, in particular, have to be considered as being present in a self-regenerating industrial burner as schematically represented in the attached FIGS. 5, 8, 10, and 11 to 16.

The industrial furnace 100 is only schematically shown and its chamber, inside which the desired heat treatment is carried out, i.e. the combustion chamber 101, is indicated with 101.

The burner 10 comprises a head 11, also called "diffusor", with which at least one first fuel injection nozzle 12, which is associable at the inlet with a fuel supplying group 13, and at least one pair of second nozzles 14 and 15, which are alternatively and selectively passed through by combustion air and by combustion exhaust gases, are associated. In particular, the second nozzles 14 and 15 of each pair of second nozzles are alternatively and selectively passed through by the combustion air that feeds the burner 10 and by the combustion exhaust gases produced inside the combustion chamber 101 and sucked from it by means of the burner 10 itself.

It is noted that the attached FIGS. 5 to 12 represent just one pair of second nozzles 14 and 15; however, it is obvious that the burner 10 can comprise more than one pair of second nozzles 14 and 15.

In a preferred embodiment of the burner 10, there are at least three pairs of second nozzles 14 and 15, each alternatively and selectively passed through by the combustion air and by the combustion exhaust gases at predetermined time intervals during the operation of the burner 10. Such an embodiment is partially represented in FIGS. 13 to 16.

The burner 10 also comprises a tubular body 16, which is open at the opposite ends and which is arranged at the front part of the head 11 and coaxial to the first fuel injection nozzle 12.

The tubular body 16 has an end, which is close to or in any case associated with or applied to the face of the head 11 at which the first nozzle 12 and the second nozzles 14 and 15 come out or in any case protrude.

The end of the tubular body 16 opposite and, therefore, distant from the one facing the head 11, extends inside the combustion chamber 101; in other words the tubular body 16 extends into the combustion chamber 101.

According to a peculiar feature of the present invention:
each of the second nozzles 14 and 15 comprises at least one first tubular portion 140 and 150, which radially lies outside the tubular body 16 and at an end of which at least one respective first port 14a and 15a, alternatively for the exit of the combustion air and for the inlet of the combustion exhaust gases, is defined, said first port being radially arranged outside the tubular body 16 and at a defined distance d from the outer lateral surface thereof,
the tubular body 16 comprises at least one radial opening 17 that is obtained as passing through its lateral wall and that acts as an inlet for the combustion air, or for at least one fraction thereof; said combustion air, alternatively exiting from one of the second nozzles 14 and 15, enters the tubular body 16, where it mixes with the fuel exiting from the first nozzle 12.

According to a further peculiar feature of the present invention, the first tubular portion 140 and 150 of each second nozzle 14 and 15 of each pair of second nozzles has a central longitudinal axis, schematically indicated by the line A, which is inclined with respect to the central longitudinal axis of the tubular body 16 itself and schematically indicated by the line B.

Figure 1:
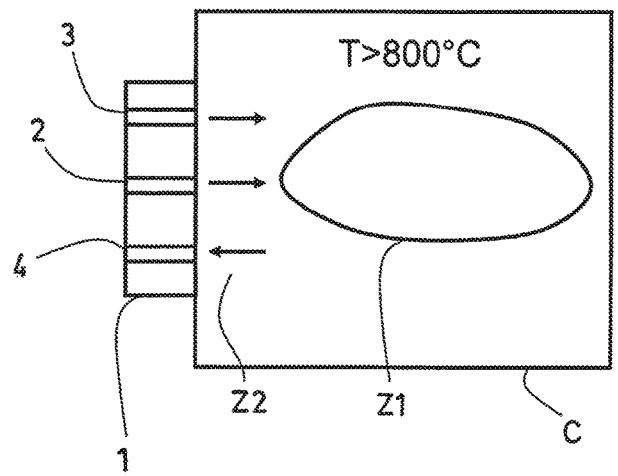
Figure 2:
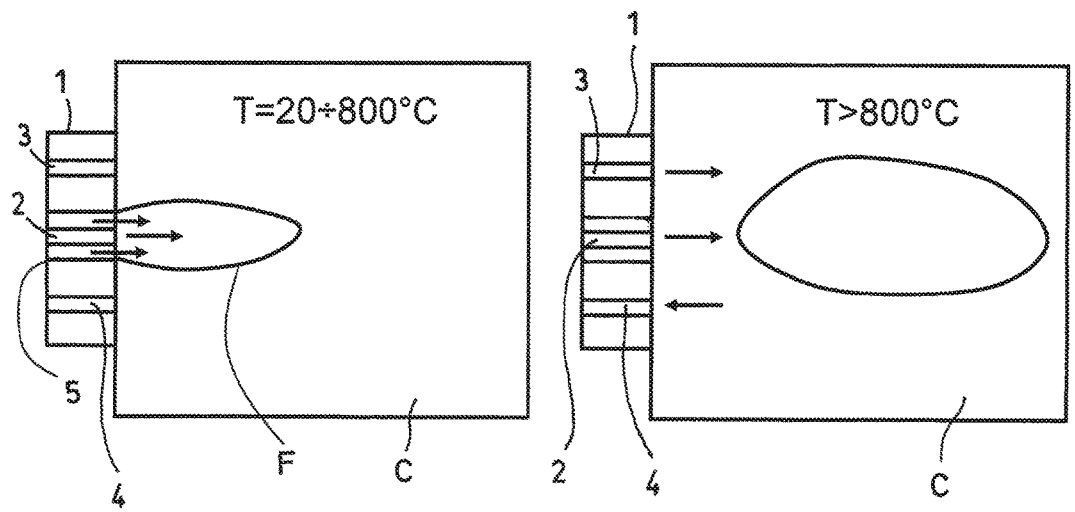
Figure 3:
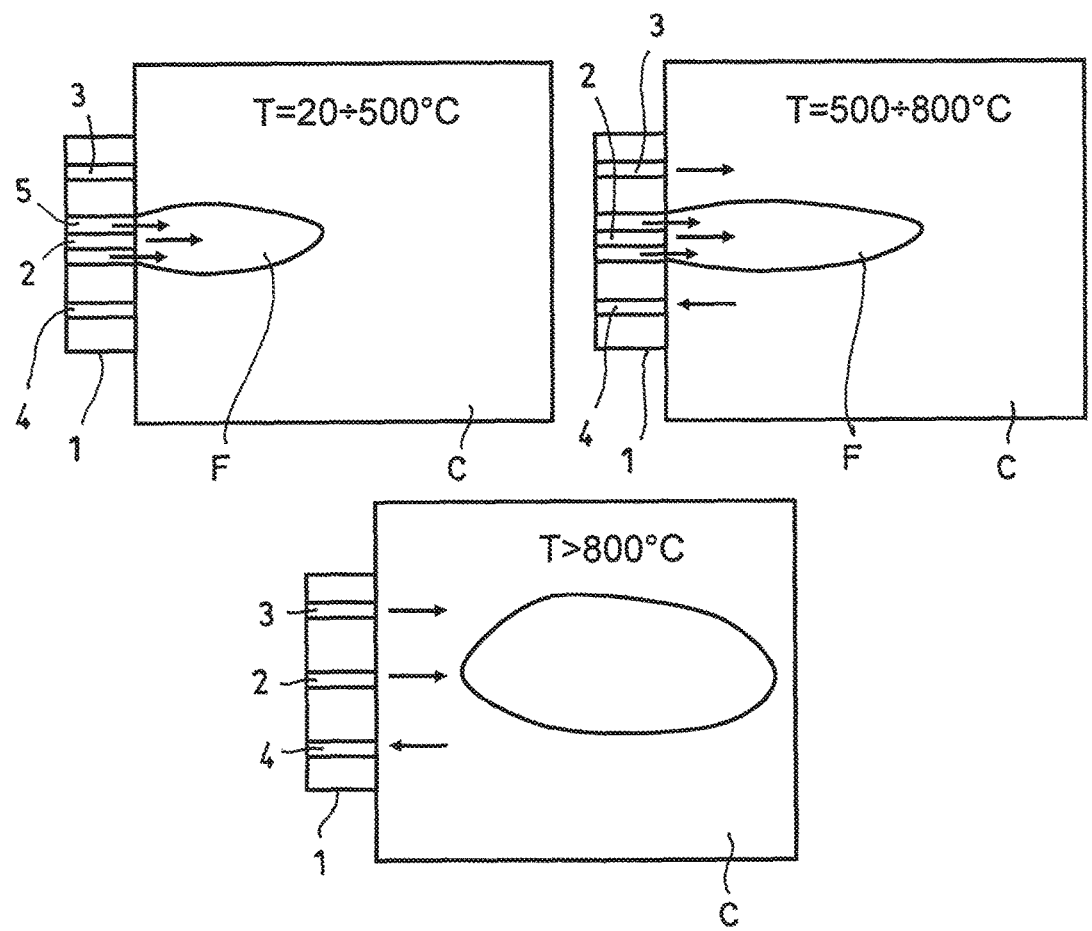
Figure 4:
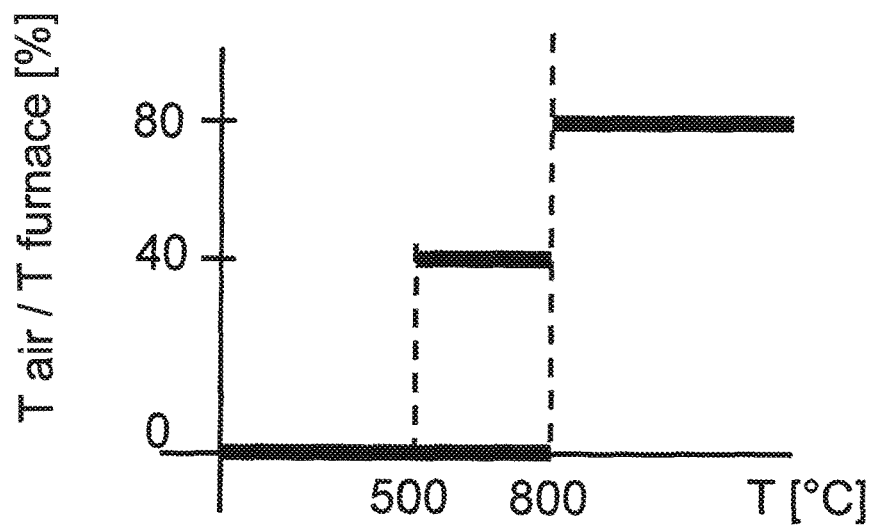
Figure 5:
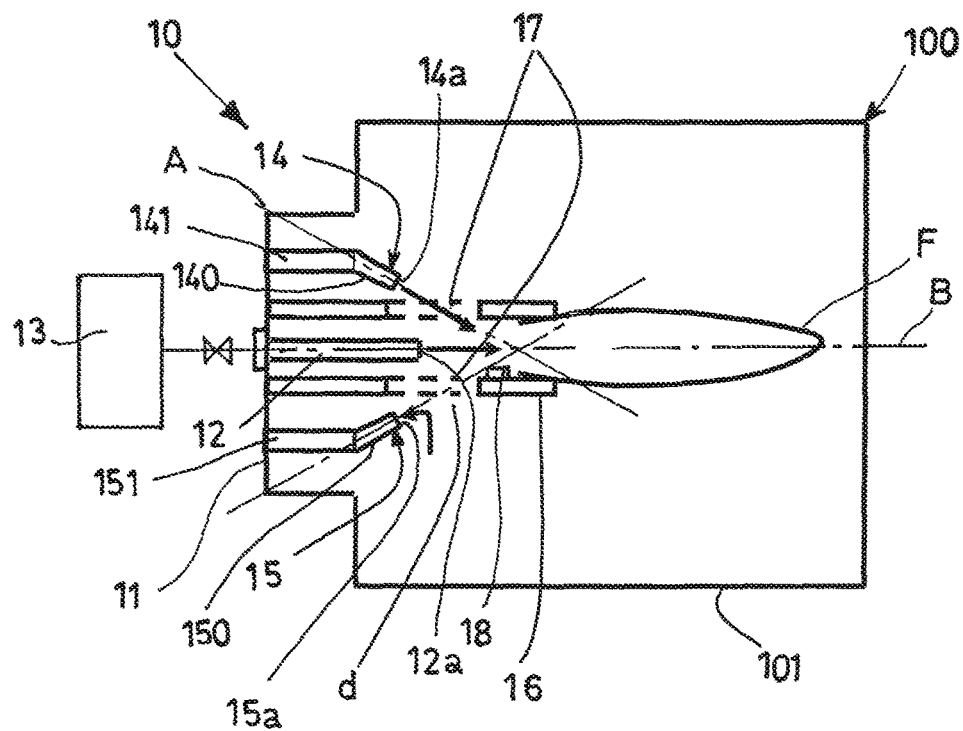
Figure 5A:
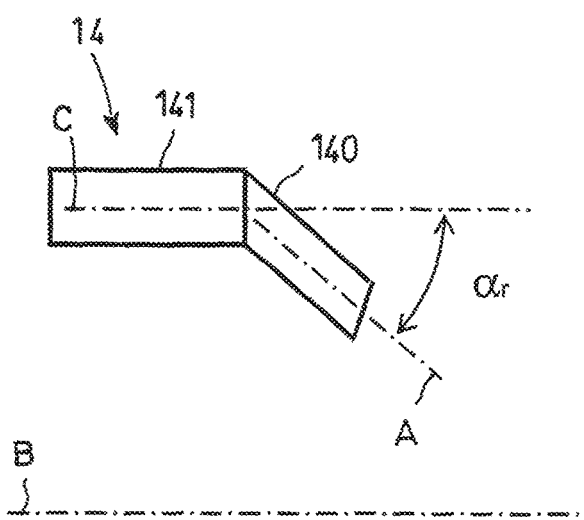
Figure 5B:
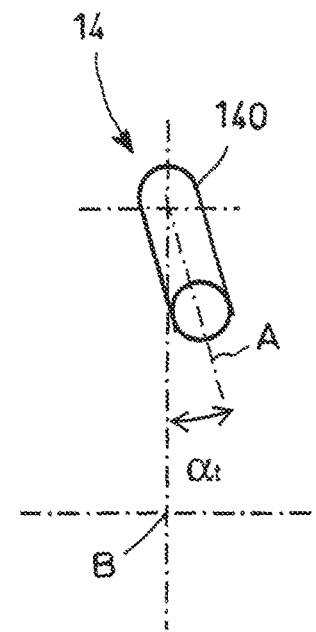

In greater detail, as schematically represented in FIGS. 5A and 5B, the inclination of the central longitudinal axis A of each first tubular portion 140 and 150 of each second nozzle 14 and 15 has at least one first "radial" inclination component $\alpha_r$ converging towards the central longitudinal axis B of the tubular body 16 (FIG. 5A).

Advantageously, the inclination of the central longitudinal axis A of each first tubular portion 140 and 150 of each second nozzle 14 and 15 has at least one second "tangential" inclination component $\alpha_t$ that arranges the central longitudinal axis A of each tubular portion 140 and 150 on a plane inclined with respect to the central longitudinal axis B of the tubular body 16 (FIG. 5B), so that the central longitudinal axis A does not intersect the central longitudinal axis B of the tubular body 16.

Overall, therefore, the central longitudinal axis A of each first tubular portion 140 and 150 of each second nozzle 14 and 15 is oblique with respect to the central longitudinal axis B of the tubular body 16.

FIG. 5A schematically shows a second nozzle 14 or 15 of each pair of second nozzles, said second nozzle comprising a duct 141 or 151 the central longitudinal axis of which (indicated by the line C) is substantially parallel to the central longitudinal axis B of the tubular body 16.

The respective first tubular portion 140 or 150 extends from an end of the duct 141 or 151, in particular from the end thereof opposite the one facing towards the head 11.

Considering the plane containing the central longitudinal axis B of the tubular body 16 and the central longitudinal axis C of the duct 141 or 151, i.e. the drawing plane of FIG. 5A, the central longitudinal axis A, or rather its projection on such a plane, has a radial inclination by an angle $\alpha_r$ with respect to the central longitudinal axis B of the tubular body 16.

It is clear that, in the case in which the central longitudinal axis A of the first tubular portion 140 or 150 of each second nozzle 14 or 15 be also equipped with a tangential inclination $\alpha_t$, the first tubular portion 140 or 150 does not lie on the drawing plane of FIG. 5A.

FIG. 5B schematically shows a front view of FIG. 5A; it schematically represents the tangential inclination $\alpha_t$ of the central longitudinal axis A of the tubular portion 140 or 150 of each second nozzle 14 or 15.

Figure 14:
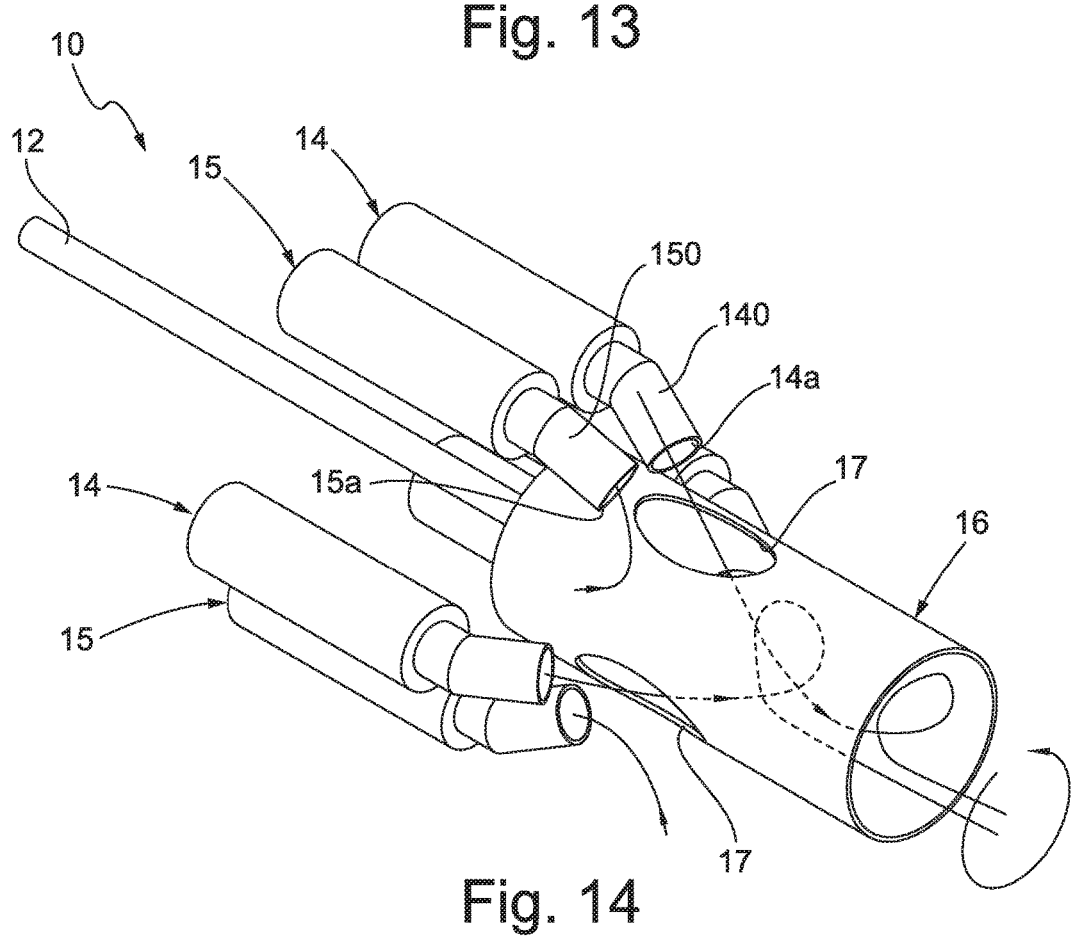
FIG. 14 is an axonometric view of the burner of FIG. 13 indicating the lines of the combustion air flow and of the combustion exhaust gases flow.
Figure 15:
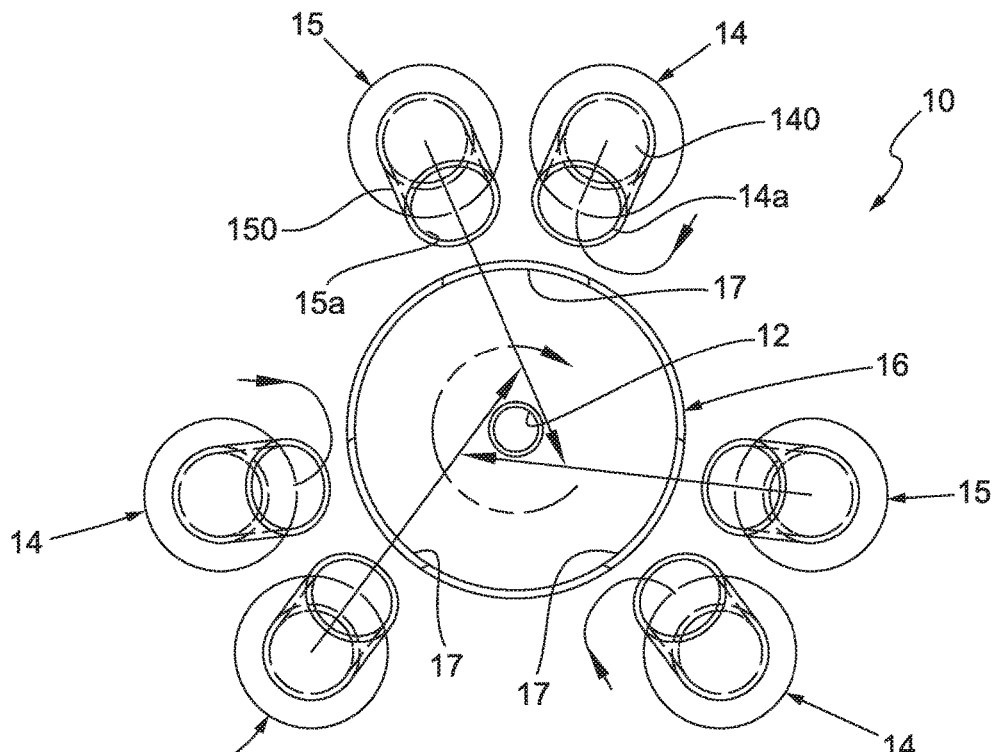
FIG. 15 is a front view of FIG. 13 indicating the lines of the combustion air flow and of the combustion exhaust gases flow.

The overall inclination of the central longitudinal axis A of the first tubular portion 140 and 150 directs the flow of combustion air introduced by the respective second nozzle 14 and 15 towards the tubular body 16 or rather towards the corresponding opening 17 obtained in the tubular body 16, so as to direct the jet of combustion air into the tubular body 16 (radial inclination $\alpha_r$), also imparting said jet a whirling motion (tangential inclination $\alpha_t$). For example, the radial inclination angle $\alpha_r$ can be selected in the range 10°-60° and the tangential inclination angle $\alpha_t$ can be selected in the range 0°-15°; in a possible embodiment the radial inclination angle $\alpha_r$ is equal to 30° and the tangential inclination angle $\alpha_t$ is equal to 5°. FIGS. 14 and 15 clearly show the lines of the flow of the combustion air introduced into the tubular body 16 and the lines of the flow of the exhaust gases sucked.

In greater detail, the first nozzle 12 extends inside the tubular body 16 for a length such that its outlet port 12a lies at the longitudinal portion of the tubular body 16 at which the openings 17 are obtained. In particular, the outlet port 12a lies on a transversal plane of the tubular body 16 that intersects the openings 17 at their half-extension parallel to the central longitudinal axis B of the tubular body 16. However, alternative embodiments are not excluded, in which the outlet port 12a lies on a different transversal plane of the tubular body 16. For example, the outlet port 12a can be located on a transversal plane of the tubular body 16 that intersects the openings 17 at a point that, considering the extension of the openings 17 in a direction parallel to the central longitudinal axis B of the tubular body 16 itself, is comprised between the half-extension of the openings 17 themselves and the terminal end thereof facing the opposite part with respect to the head 11.

In the lateral wall of the tubular body 16 there is a plurality of openings 17 arranged distanced apart from one another along at least one circumferential portion of the tubular body 16; in particular, in the lateral wall of the tubular body 16 a number of openings 17 equal to the number of second nozzles 14, 15 is obtained.

For each pair of second nozzles 14 and 15 a respective pair of openings 17 can be provided, each of which faces a respective first port 14a and 15a; alternatively, a unique opening 17 can be provided, which is common to the second nozzles 14 and 15 of the same pair of second nozzles and which both first ports 14a and 15a of the two second nozzles 14 and 15 of such a pair face. In this last case, therefore, there will be a number of openings 17 equal to half the number of second nozzles 14 and 15 and, therefore, equal to the number of pairs of second nozzles 14 and 15, in which each opening 17 is interlocked to the two second nozzles 14 and 15 of the same pair, as represented in FIGS. 13 to 16 in which there are three pairs of second nozzles 14 and 15 and three openings 17.

In general, therefore, the number of second nozzles 14 and 15 is equal and the tubular body 16 comprises a number of openings 17 equal to the number of second nozzles 14 and 15, in which each opening 17 is interlocked to a respective second nozzle, or a number of openings 17 equal to half the number of second nozzles 14 and 15 (i.e. the number of openings 17 is equal to the number of pairs of second nozzles 14 and 15), in which each opening 17 is interlocked to a respective pair of second nozzles 14 and 15.

At the limit a unique pair of second nozzles 14 and 15 and a unique opening 17, which both first ports 14a and 15a face, are present.

The second nozzles 14, 15 are arranged so that their first port 14a and 15a, alternatively for the exit of the combustion air and for the inlet of the combustion exhaust gases, radially lies outside the tubular body 16—i.e. on an ideal circumference centred on the longitudinal axis B of the tubular body 16 and having a greater diameter than the outer diameter of the portion of the tubular body 16 facing it—and at least partially faces a respective opening at a non-zero distance d from the lateral outer surface of the tubular body 16.

In particular, the second nozzles 14 and 15 themselves radially lie outside the tubular body 16.

In the case in which more pairs of second nozzles 14 and 15 are present, the second nozzles that, in one and the same operating cycle of the burner 10, are passed through by combustion air or by the combustion exhaust gases, can be arranged, distanced apart from one another, on a respective half-cylindrical surface that outwardly wraps around the tubular body 16, or can be arranged alternated with the second nozzles that in the same operating cycle of the burner 10 are passed through by the opposite flow, this last case being represented for example in FIGS. 13 to 16.

Figure 9:
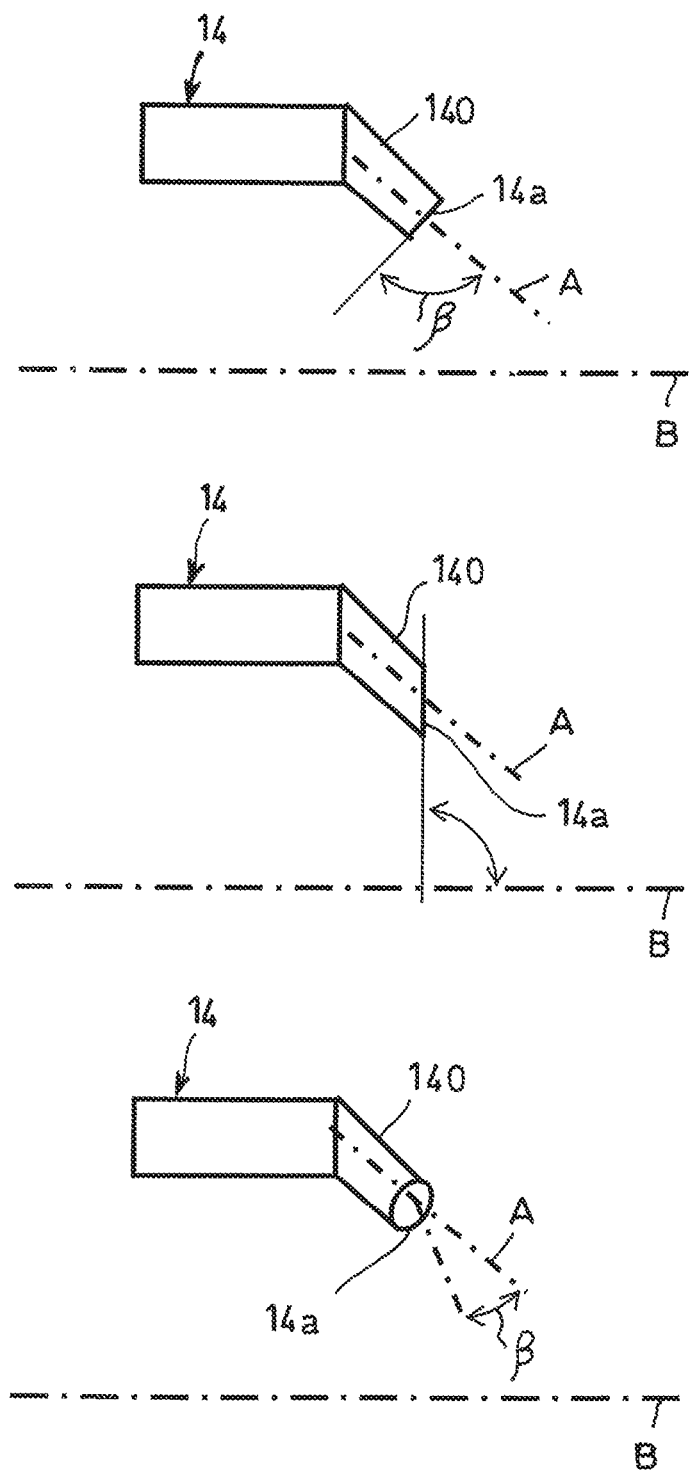

As is clear from FIG. 9, the end of the first tubular portion 140 and 150 of each second nozzle 14 and 15 that defines the respective first port 14a and 15a is suitably shaped and is defined on a lying plane that can be orthogonal or inclined with respect to the central longitudinal axis A by an angle β (FIG. 9).

By modifying the values of the radial $\alpha_r$ and of the tangential $\alpha_t$ inclination angles and as defined above it is possible to generate a "swirling" motion of the combustion air injected into the tubular body 16 and, therefore, to act on the length of the flame generated by the burner 10. On the other hand, by modifying the inclination angle β of the outlet port 14a and 15a it is possible to further localise the suction of the combustion exhaust gases at areas not affected by the flame.

Inside the tubular body 16 a trigger device 18 is arranged, which is suitable for generating the ignition spark of the combustion.

The first nozzle 12 injects the fuel into the tubular body 16 forming a jet that propagates from the longitudinal portion of the tubular body 16 at which the openings 17 are obtained.

One of the two second nozzles, in FIGS. 5, 10, 11, 12 and 14 the second nozzle 14 and in FIG. 15 the second nozzle 15, is used to inject the combustion air into the combustion chamber 101, whereas the other one of the two second nozzles, in FIGS. 5, 10, 11, 12 and the second nozzle 15 and in FIG. 15 the second nozzle 14, is used to suck the combustion exhaust gases from the combustion chamber 101, as schematically indicated by the arrows therein shown.

The combustion air injected by the second nozzle 14 penetrates into the tubular body 16 through the facing opening 17. The combustion air that enters the tubular body 16 mixes with the fuel injected thereinto by the first nozzle 12 and, after triggering, inside the tubular body 16 a flame F is generated that is able to be stabilised, also with the aid of provisions and/or systems known to the person skilled in the art and for this reason not detailed, and to remain confined and anchored to the tubular body 16.

The combustion exhaust gases are sucked from an outer area (radially outer) to the tubular body 16 by the second nozzle 15. Since the flame F is confined inside the tubular body 16 and in any case anchored to the tubular body 16, the suction by the second nozzle of unburnt substances directly from the flame F itself is avoided.

As known to the person skilled in the art, indeed, the suction of a gas by a nozzle is greatly localised at the inlet end of the nozzle itself; on the contrary, a jet of gas emitted by a nozzle is coherent with itself even at a distance from the outlet end of the nozzle itself. In this specific case, the jet of combustion air emitted by the second nozzle 14 remains coherent with itself even at a distance from the first port 14a from which it is emitted, so that the combustion air manages to penetrate into the tubular body 16 through the facing opening 17. The combustion exhaust gases, on the contrary, are sucked by the second nozzle 15 locally and close to its first port 15a that, lying outside the tubular body 16, prevents the suction of unburnt substances from the inside of the tubular body 16 itself.

This effect, moreover, can be supported by the fact that the combustion exhaust gases present outside the tubular body 16 can be sucked into it through the same openings 17 and thus be recirculated, even if what mainly prevents the suction of unburnt substances coming from the flame is the localisation of the suction of the combustion exhaust gases at the first port 14a and 15b of the second nozzles 14 and 15.

FIG. 6 shows a burner 10 according to the present invention depicted complete with the heat storage elements and with the switching device of the flows of combustion air and of combustion exhaust gases.

The burner 10 comprises a pair of heat storage elements respectively indicated with 19 and 20, which are separated from one another and arranged upstream of the face of the head 11 opposite that at which the first nozzle 12 and the second nozzles 14 and 15 come out or protrude.

The heat storage elements 19 and 20 have a known structure and, for this reason, are not described in detail; in particular, they contain a regeneration mass which is suitable for exchanging heat with the fluid that passes through it and which can, for example, have a honeycomb structure or a ball bearing structure and can be made of ceramic materials.

The two heat storage elements 19 and 20 can also consist of separate sections of a unique heat storage element which are thermally insulated from each other.

Each of such heat storage elements 19 and 20 is in fluid communication with a second port, 14b and 15b respectively, alternatively for the inlet of combustion air and for the exit of exhaust combustion gases, of at least one respective second nozzle 14 and 15, where the second port 14b and 15b is opposite the respective first port 14a and 15a.

At the end of the heat storage elements 19 and 20 opposite that in fluid communication with the second nozzles 14 and 15, there is a switching device 21 for switching the flow that passes through the second nozzles 14 and 15 and the respective heat storage element 19 and 20.

In greater detail and with specific reference to FIG. 6, the heat storage element 19 is in fluid communication with the second port 14b of the second nozzle 14 and the heat storage element 20 is in fluid communication with the second port 15b of the second nozzle 15.

The switching device 21, in practice consisting of a set of ON-OFF valves, can be controlled between a first position and a second position.

In the first position, represented in the first diagram of FIG. 6, the combustion air is fed through the heat storage element 19 and the respective second nozzle 14, whereas the combustion exhaust gases are sucked by the other second nozzle 15 and injected by it into the respective heat storage element 20.

In the second position, represented in the second diagram of FIG. 6, the flows of combustion air and of combustion exhaust gases are inverted: the combustion air is fed through the heat storage element 20 and the respective second nozzle 15, whereas the combustion exhaust gases are sucked by the other second nozzle 14 and injected by it into the respective heat storage element 19. In this way, the two heat storage elements 19 and 20 alternatively accumulate and release heat, respectively from the combustion exhaust gases and to the combustion air that passes through them.

The burner 10, therefore, is capable of operating under "self-regenerating" conditions and, therefore, of preheating the combustion air effectively even when the temperature inside the combustion chamber 101 is below the self-ignition temperature of the fuel (800° C. for natural gas).

The provision of the tubular body 16 and its arrangement and structure in relation to the second nozzles 14 and 15, indeed, allow a combustion to be carried out with a stable and confined flame or in any case a flame that is anchored to the tubular body 16, sucking the combustion exhaust gases from the combustion chamber 101 to recover its heat in order to pre-heat the combustion air used for generating and maintaining the flame itself, without the risk of sucking with them unburnt substances from the flame itself.

Figure 7:
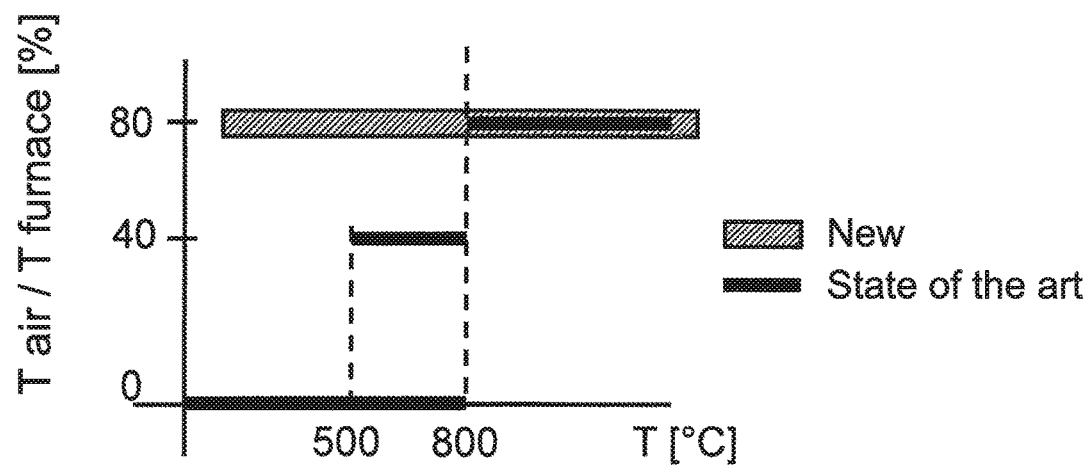

FIG. 7 shows a graph reporting the preheating efficiency values as a function of the temperature inside the combustion chamber of an industrial furnace of an industrial "self-regenerating" burner 10 according to the present invention in comparison to those of an industrial "self-regenerating" burner according to the prior art.

It is noted that the preheating efficiency of the "self-regenerating" burner according to the present invention is always equal to about 80%, whatever the temperature inside the combustion chamber be and, in particular, even at temperatures below 800° C. On the contrary, the preheating efficiency of the "self-regenerating" burners according to the prior art falls to 0 or to 40% when the temperature inside the combustion chamber is below 800° C., since they are not capable of producing an anchored and stable flame that is compatible with preheating, through self-regeneration of 100% of the combustion air.

In particular, experimental tests have been carried out on the operation of a self-regenerating burner according to the present invention of the type of that represented in FIGS. 13 to 16 and equipped with three pairs of second nozzles equally spaced apart from each other along a circumference that is concentric and outside the tubular body and each of said second nozzles facing a respective opening obtained in the tubular body itself, in which the central longitudinal axis of the first tubular portion of each second nozzle is inclined by a radial inclination angle equal to 30° and by a tangential inclination angle equal to 5°.

The burner object of such experimental tests has a power of 650 kW and was installed in a furnace equipped with a square-section chamber having side of 2 m and length equal to 5.5 m. The tests were carried out using natural gas as fuel, operating with an excess of combustion air comprised between 10% and 15%; the tests were carried out operating both at the maximum nominal flow rate, and at lower flow rates than the latter by about 50-55%. The inversion of the combustion air flow and of the combustion exhaust gases flow respectively injected and sucked by each second nozzle occurred every 20 or 30 seconds. The flow rate of the combustion exhaust gases sucked through the burner is equal to about 80-90% of the gases produced by the combustion. The burner was tested both in the ON/OFF mode (i.e. successively switching on and off), and in the continuous mode (i.e. with continuous introduction of combustion gas).

Figure 17:
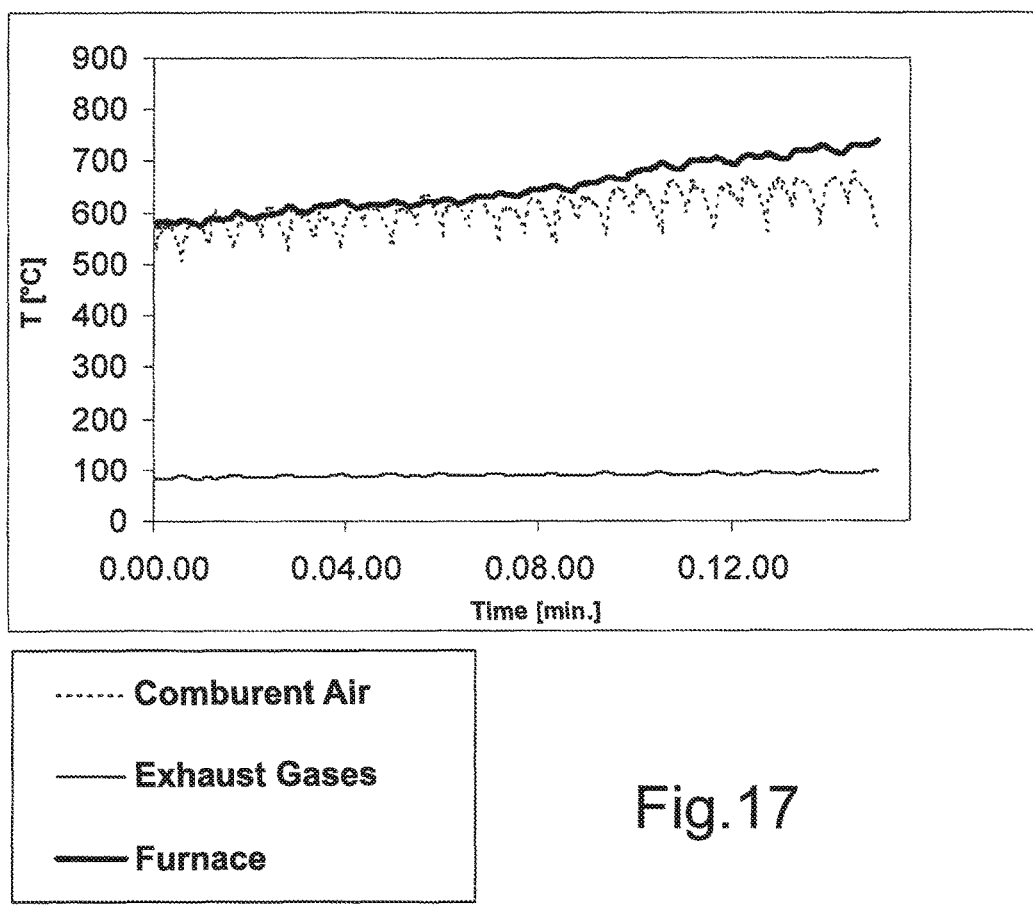
FIG. 17 is a graph showing the temperature course state of the combustion air of the combustion exhaust gases and that inside a heat treatment furnace, to which a self-regenerating industrial burner according to the present invention has been applied, as a function of time.
Figure 18:
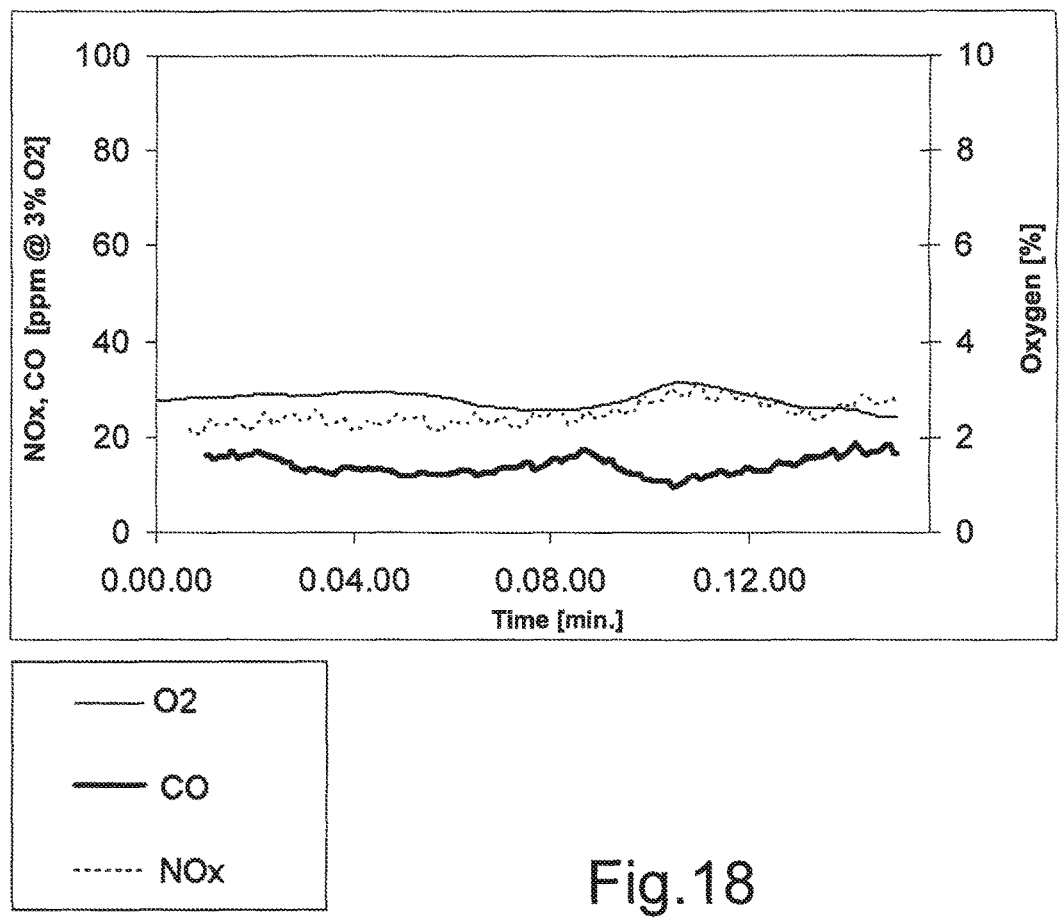
FIG. 18 is a graph showing the emission values of oxygen, carbon monoxide and nitrogen oxides detected during the operation of the furnace under the conditions indicated in the graph of FIG. 13.

The graphs shown in FIGS. 17 and 18 show the data detected experimentally.

FIG. 17 shows the course state temperature as a function of time; it is noted that the temperature inside the furnace is comprised between 580° C. and 740° C., the combustion air is preheated at a temperature comprised between 500° C. and 650° C., whereas the combustion exhaust gases are cooled at about 100° C.

Figure 16:
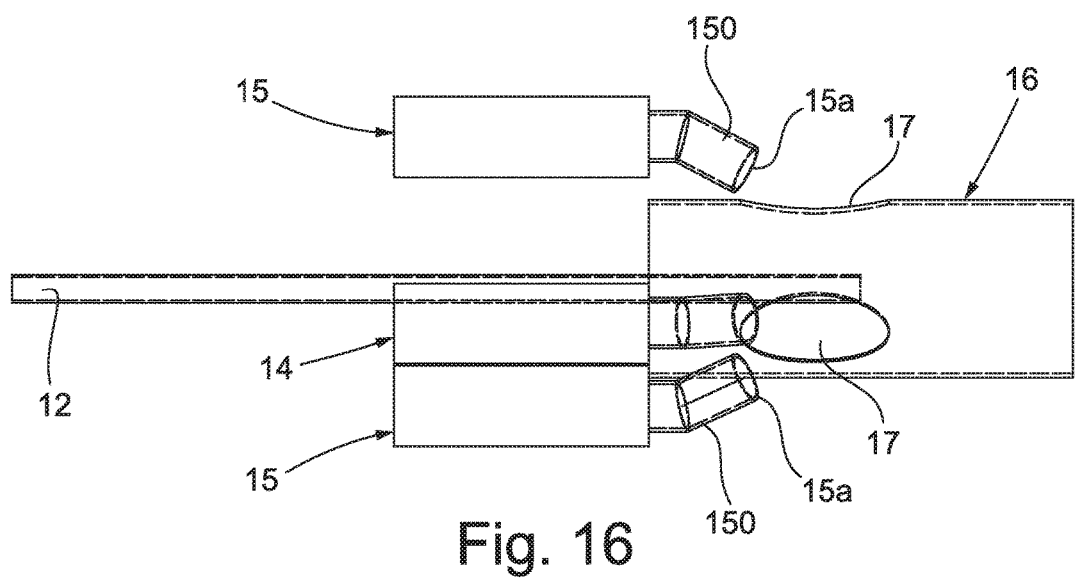
FIG. 16 is a side elevation view of FIG. 13.

FIG. 18 is a graph showing the values of oxygen ($O_2$), carbon monoxide (CO) and nitrogen oxides ($NO_x$) detected in the combustion exhaust gases sucked from the burner being carried out under the conditions indicated in the graph of FIG. 16. In particular, it is noted that the values of carbon monoxide (CO) present in the combustion exhaust gases sucked from the burner are less than 20 ppm.

Figure 8:
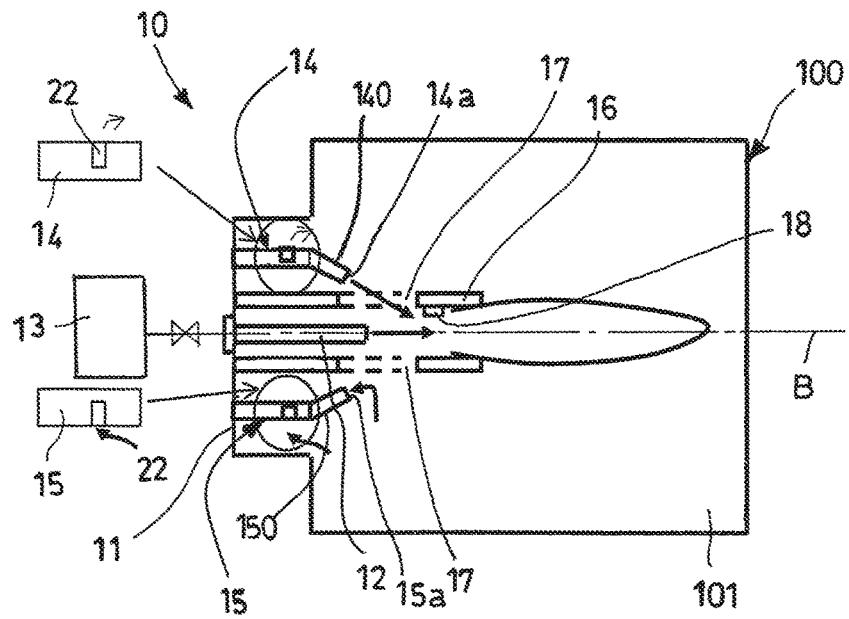

FIG. 8 shows a first alternative embodiment of the self-regenerating burner 10 according to the present invention, in which each second nozzle 14 and 15 comprises a tubular section (in practice consisting of the duct 141 and 151) that protrudes from the head towards the inside of the combustion chamber 101, that in any case lies outside the tubular body 16 and that joins to the respective first tubular portion 140, 150, in which at such a tubular section at least one radial slot 22 is obtained. The purpose of such slots 22 is that of further promoting the suction of the combustion exhaust gases at an area of the combustion chamber 101 which is not affected by the flame. When each second nozzle 14 and 15 is used for introducing the combustion air and is, therefore, passed through by the flow of combustion air, the amount of air that comes out of the respective slot 22 is negligible. When, on the contrary, each second nozzle 14 and 15 is used to suck the combustion exhaust gases from the combustion chamber, these gases are sucked both through the respective first end 14a and 15a, and through the respective slot 22 (as schematically represented by the arrows of different thickness shown in the enlarged scale detail).

Figure 10:
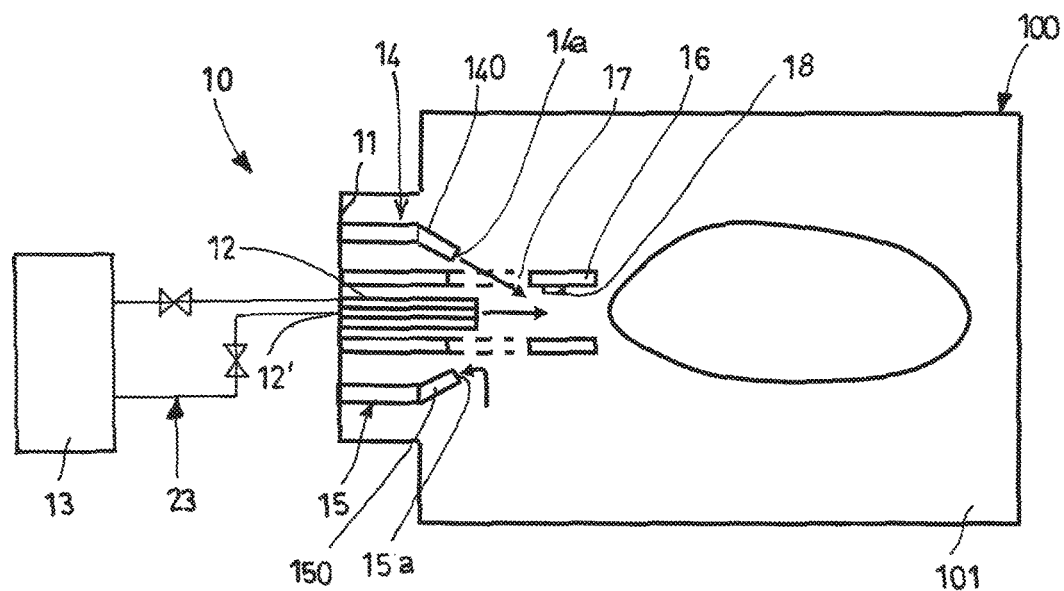

FIG. 10 shows a second alternative embodiment of the self-regenerating burner 10 according to the present invention, in which there is a pair of first nozzles, 12 and 12' respectively, arranged coaxial to each other and of which one (the first nozzle 12') is inside the other (the first nozzle 12) and therefore having a smaller diameter than the latter.

The first nozzles 12, 12' are associated at the inlet with a fuel supplying group 13 by means of a switching group 23.

The switching group 23, in practice consisting of ON-OFF valves, is arranged to switch the fuel supply flow fed by the first nozzles 12 and 12' between at least one first operating configuration of the burner 10, in which the burner 10 operates under conditions of flame constrained or in any case anchored to the tubular body 16 and the fuel is fed through the first most outer nozzle 12, and at least one second operating configuration, in which the burner 10 operates under conditions of flame detached from the tubular body 16 or under flameless conditions and the fuel is fed through the first nozzle 12' inside the other one.

This second operating configuration of the burner 10 is obtained when the temperature inside the combustion chamber 101 exceeds the self-ignition temperature of the fuel (i.e. 800° C.). This, if necessary, allows the emissions of NOx to be reduced when the temperature inside the combustion chamber 101 is above 800° C.

This second alternative embodiment of the burner 10 also allows the flame to be lengthened if necessary due to the fact that the flame itself is detached from the tubular body 16. Typically, the first most inner nozzle 12' introduces the fuel at high introduction velocity, generally comprised between 80 m/s and 130 m/s.

Figure 11:
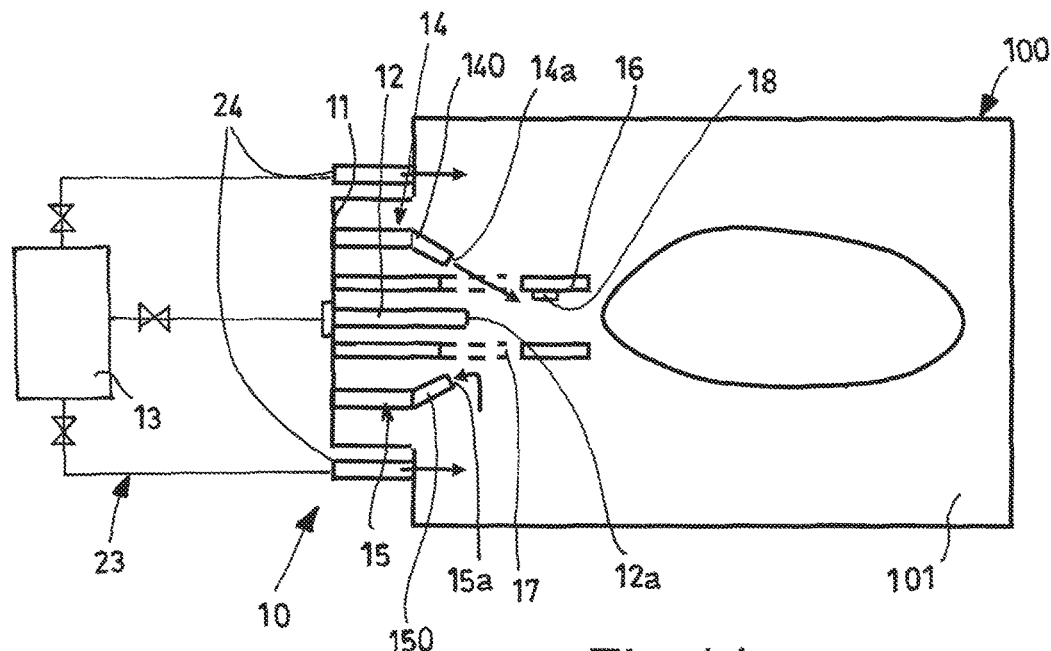

FIG. 11 schematically shows a third possible alternative embodiment of the self-regenerating burner 10 according to the present invention, in which the burner 10 also comprises at least one pair of third fuel injection nozzles 24, which are associable, at the inlet, with the fuel supplying group 13 and which are arranged radially outside the tubular body 16 and substantially parallel to the longitudinal axis B of the tubular body 16.

A respective switching group 23 of the fuel supplying flow is arranged to switch the fuel flow fed through the first nozzle 12 and the third nozzles 24 between at least one first operating configuration and a second operating condition of the burner 10.

In the first operating configuration, the burner 10 operates under conditions of flame constrained or in any case anchored to the tubular body 16 and the fuel is fed through the first nozzle 12.

In the second operating condition, the burner 10 operates under flameless conditions, the temperature inside the combustion chamber being above the self-ignition temperature of the fuel (i.e. 800° C.), and the fuel is fed through the third nozzles 24. Even in this case, if necessary, this allows the emissions of NOx to be reduced at temperatures inside the combustion chamber above 800° C.

The third nozzles 24 introduce the fuel directly into the combustion chamber 101 at high speed, generally comprised between 80 m/s and 130 m/s.

Figure 12:
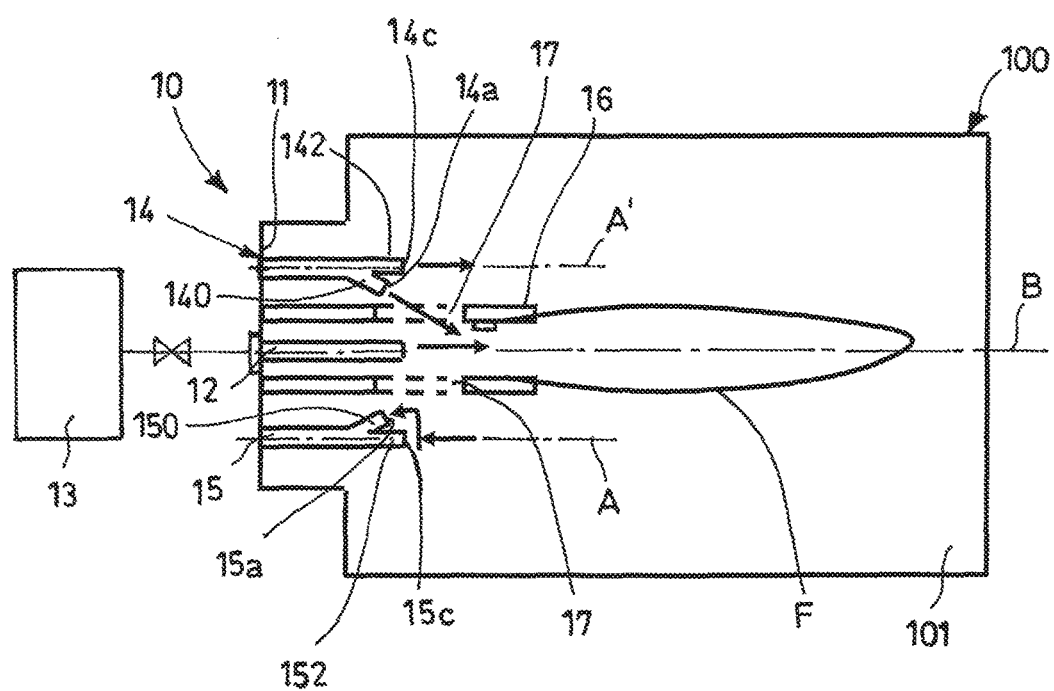
Figure 13:
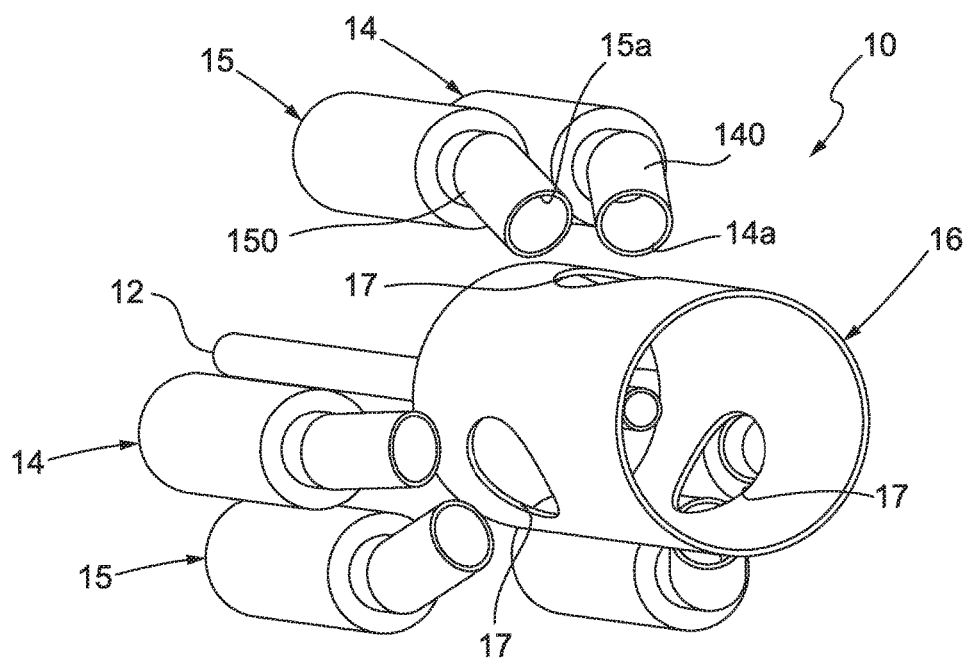
FIG. 13 is an axonometric view of a possible embodiment of the basic structure of the self-regenerating burner according to the present invention.

FIG. 12 shows a fourth possible alternative embodiment of the self-regenerating burner 10 according to the present invention, in which each second nozzle 14 and 15 comprises at least one second tubular portion 142, 152 at one end of which an auxiliary port is defined, 14c and 15c respectively, alternatively for the exit of combustion air and for the inlet of combustion exhaust gases, in which said second tubular portion 142, 152 (and with it the respective auxiliary port 14c, 15c) radially lies outside the tubular body 16 and has the respective central longitudinal axis A' that is substantially parallel to the longitudinal axis B of the tubular body 16.

Each second nozzle 14 and 15, therefore, when passed through by the combustion air, introduces a fraction of the latter into the tubular body 16, by means of the first port 14a and 15a and the facing opening 17, and a fraction directly into the combustion chamber 101 in a direction parallel to the axis of the tubular body 16.

In this way, it is possible if necessary to decrease the amount of NOx and/or to lengthen the flame F.

Considering a burner 10 according to the present invention applied to a furnace 100 for the heat treatment of products, in particular semi-finished products and iron and steel products, metal and inorganic materials, it can be controlled with the steps comprising:

feeding the fuel through the at least first nozzle 12 with an introduction velocity comprised between 15 m/s and 30 m/s, thus generating, in particular, a fuel jet that is kept coherent at least for an axial distance equal to or greater than the axial distance between the outlet port 12a of the first nozzle 12 itself and the openings 17;

feeding the combustion air by introducing it into one of the second nozzles 14 or 15 with an introduction velocity comprised between 30 m/s and 100 m/s thus generating a combustion air jet that is kept substantially coherent at least for the distance which separates the respective first port 14a and 15a from the outer lateral surface of the tubular body 16, in which at least one fraction of the combustion air thus fed enters, through the corresponding opening 17, the tubular body 16 where it mixes with the fuel fed by the first nozzle 12 to generate a flame F that is confined or in any case anchored to the tubular body 16;

evacuating the combustion exhaust gases exiting from the end of the tubular body 16 opposite that facing the head 11 or in any case present in the combustion chamber 101, sucking them from the outside of the tubular body 16 through the other of the second nozzles 14 or 15 with a suction velocity comprised between 30 m/s and 100 m/s.

Since the burner 10 is of the "self-regenerating" type:

the combustion air supply comprises making the combustion air flow through the heat storage element 19 or 20 associated with the second nozzle 14 or 15 used for feeding the combustion air, before it is introduced into the latter, and the evacuation of the combustion exhaust gases from the combustion chamber 101 comprises making the combustion exhaust gases sucked by the other of the second nozzles 14 or 15 through the respective heat storage element 19 or 20 flow.

The flows of combustion air and of combustion exhaust gases that pass through the second nozzles 14 and 15 and the respective heat storage elements 19 and 20 are inverted at pre-determinable time intervals, so that the heat stored in the heat storage element 19 or 20 previously passed through by the combustion exhaust gases is released to the combustion air preheating it and the other heat storage element 19 or 20 accumulates the heat from the exhaust gases being evacuated.

If the burner 10 is of the type represented in FIG. 10 or 11, when the temperature inside the combustion chamber 101 is above the self-ignition temperature of the fuel (i.e. 800° C.), the supply of the fuel through the first nozzle 12 is interrupted and the fuel is fed, respectively, through the other first nozzle 12' or the third nozzles 24 with an introduction velocity comprised between 80 m/s and 130 m/s, to generate a flameless combustion downstream of the tubular body 16 or to generate a flame detached from the tubular body 16.

The industrial burner object of the present invention has the advantage of being capable of operating as "self-regenerating" burner that, regardless of the temperature inside the combustion chamber, is capable of generating a flame that can be stabilized and anchored using for it just preheated combustion air, instead of cold combustion air.

The industrial "self-regenerating" burner according to the present invention has the advantage of also being capable of operating in the flame mode, and not only in the flameless mode, preheating the totality of the combustion air and is capable of keeping the level of unburnt substances (in particular CO) sucked together with the combustion fumes below the limits set by the current standards (typically below 100 ppm).

The self-regenerating industrial burner and industrial furnace for carrying out self-regenerating combustion processes thus conceived can undergo numerous modifications and variants, all of which are covered by the invention; moreover, all of the details can be replaced by technically equivalent elements. In practice, the materials used, as well as the sizes, can be whatever according to the technical requirements.

The invention claimed is:

1. A self-regenerating industrial burner comprising:
 a head with which at least one first fuel injection nozzle, that can be associated at an inlet with a fuel supplying group, and at least one pair of second nozzles, that can be alternatively and selectively passed through by combustion air and combustion exhaust gases, are associated; and
 a tubular body open at opposite ends and arranged, at a front part of the head and coaxial to the at least one first nozzle with an end close to the face of the head at which the first nozzle and the at least one pair of second nozzles come out or protrude and an opposite end distant from the face, wherein, when the burner is applied to a combustion chamber, or a chamber of an industrial furnace, the tubular body extends into the combustion chamber,
 wherein each of the second nozzles comprises at least one first tubular portion, which radially lies outside the tubular body and at an end of which at least one first port is defined, the first port radially lying outside the tubular body and being alternatively for exit of the combustion air and for inlet of the exhaust combustion gases, and
 wherein the tubular body comprises at least one radial opening passing through its lateral wall, wherein the at least one opening acts as an inlet for at least the combustion air exiting from one of the second nozzles of the at least one pair of second nozzles, or for at least one fraction thereof, into the tubular body where the combustion air mixes with fuel exiting from the at least one first nozzle.

2. The burner according to claim 1, wherein the tubular body comprises a plurality of the radial openings arranged to be spaced from each other along at least one circumferential portion of the tubular body.

3. The burner according to claim 1, wherein the at least one first nozzle extends into the tubular body up to at least a longitudinal portion thereof at which the at least one radial opening is obtained.

4. The burner according to claim 1, wherein each second nozzle of the at least one pair of second nozzles includes the respective first port, alternatively for the exit of combustion air and for the inlet of exhaust combustion gases, which is arranged radially outside the tubular body at a respective the radial opening and at a defined distance from an outer lateral surface of the tubular body.

5. The burner according to claim 1, wherein the first tubular portion of each of the second nozzles of the at least one pair of second nozzles has a central longitudinal axis inclined with respect to the central longitudinal axis of the tubular body.

6. The burner according to claim 5, wherein the central longitudinal axis of the first tubular portion of each the second nozzle includes at least one first radial inclination component converging towards the central longitudinal axis of the tubular body.

7. The burner according to claim 6, wherein the central longitudinal axis of the first tubular portion of each of the second nozzle includes a second tangential inclination component.

8. The burner according to claim 1, further comprising:
 a pair of heat storage elements, which are separated from each other and arranged upstream of a face of the head opposite that at which the at least one first nozzle and the at least one pair of second nozzles come out or protrude and which are in fluid communication with a second port, alternatively for inlet of combustion air and for exit of exhaust combustion gases, of a respective second nozzle of the at least one pair of second nozzles, the second port being opposite to the first port; and
 a flow switching device for switching a flow which passes through the second nozzles of the at least one pair of second nozzles and the respective of the heat storage elements,
 wherein the switching device is controllable between a first position, wherein the combustion air is fed through one of the heat storage elements of the at least one pair of heat storage elements and the respective of the second nozzle of the at least one pair of second nozzles and exhaust combustion gases are evacuated through the other second nozzle of the at least one pair of second nozzles and the respective heat storage elements of the at least one pair of heat storage elements, and a second position, wherein flows of combustion air and exhaust combustion gases through the heat storage elements of the at least one pair of heat storage elements and the respective second nozzles of the at least one pair of second nozzles are inverted.

9. The burner according to claim 1, wherein the first port, alternatively for exit of combustion air or for inlet of exhaust combustion gases, of each of the second nozzles of the at least one pair of second nozzles lies on a plane orthogonal or inclined with respect to the corresponding the central longitudinal axis of the respective first tubular portion.

10. The burner according to claim 1, wherein each second nozzle of the at least one pair of second nozzles comprises a tubular section which protrudes from the head and at which at least one radial slot is obtained.

11. The burner according to claim 1, further comprising a pair of the first nozzles arranged coaxial to each other and a fuel feeding flow switching group configured to switch flow of fuel fed by the first nozzles of the pair between at least one first operating configuration of the burner,
 wherein the burner operates under conditions of flame constrained or however anchored to the tubular body and the fuel is fed through the first nozzle of the pair of first coaxial nozzles which surrounds the other, and at least one second operating configuration, and wherein the burner operates under conditions of flame detached from the tubular body or under flameless conditions and the fuel is fed through the first nozzle of the pair of first coaxial nozzles which is inside the other.

12. The burner according to claim 1, further comprising:
at least one pair of third fuel injection nozzles, which are associable, at an inlet, with the fuel feeding group and which are arranged radially outside the tubular body and substantially parallel to the longitudinal axis of the tubular body; and
a fuel feeding flow switching group configured to switch flow of fuel fed by the at least one first nozzle and by the third nozzles between at least one first operating configuration of the burner,
wherein the burner operates under conditions of flame constrained or however anchored to the tubular body and the fuel is fed through the at least one first nozzle, and at least one second operating configuration, wherein the burner operates under flameless conditions and the fuel is fed through the at least one pair of third nozzles.

13. The burner according to claim 1, wherein each second nozzle of the at least one pair of second nozzles comprises a second tubular portion which radially lies outside the tubular body and which includes at an end at least one auxiliary port, alternatively for exit of combustion air and for inlet of exhaust combustion gases, which radially lies outside the tubular body, and
wherein the central longitudinal axis of the second tubular portion is substantially parallel to the central longitudinal axis of the tubular body.

14. An industrial furnace for heat treatment of products, or semi-finished products and iron and steel products, metal and inorganic materials, comprising:
a heat treatment chamber delimited by walls and by a vault; and
at least one burner according to claim 1 and which is associated, mounted or integrated in at least one of the walls or of the vault,
wherein the tubular body extends into the chamber.

15. A control method for controlling a burner according to claim 1, when applied to a combustion chamber, or a chamber of an industrial furnace for heat treatment of products, or semi-finished products and iron and steel products, metal and inorganic materials, comprising:
feeding the fuel through the at least one first nozzle with an introduction velocity between 15 m/s and 30 m/s;
feeding combustion air by introducing the combustion air into one of the second nozzles of the at least one pair of second nozzles with an introduction velocity between 30 m/s and 100 m/s, to generate a combustion air jet that remains substantially coherent at least for a distance that separates the respective first port from an outer lateral surface of the tubular body, wherein at least one fraction of the combustion air thus fed enters, through the at least one radial opening, the tubular body where it mixes with the fuel fed by the at least one first nozzle to generate a flame constrained or however anchored to the tubular body; and
evacuating the exhaust combustion gases exiting from the end of the tubular body opposite the one end facing the head or however present in the combustion chamber, sucking them from outside of the tubular body through the other of the second nozzles of the at least one pair of second nozzles with a suction velocity between 30 m/s and 100 m/s.

16. The control method according to claim 15,
wherein the feeding combustion air comprises making the combustion air flow through a heat storage element of at least one pair of heat storage elements, which are separated from each other and arranged upstream of a face of the head opposite that at which the at least one first nozzle and the at least one pair of second nozzles come out or protrude and which are in fluid communication with a second port, alternatively for inlet of combustion air and for exit of exhaust combustion gases, of a respective second nozzle of the at least one pair of second nozzles, the second port being opposite the first port, before introducing it into the respective second nozzle of the at least one pair of second nozzles,
wherein the evacuating of the exhaust combustion gases comprises making the exhaust combustion gases sucked by the other of the second nozzles of the at least one pair of second nozzles flow through the other heat storage element of the at least one pair of heat storage elements, and
wherein flows of combustion air and of exhaust combustion gases which pass through the second nozzles of the at least one pair of second nozzles are inverted at pre-determinable time intervals.

17. The control method according to claim 15, further comprising interruption of the feeding the fuel through the at least one first nozzle and feeding the fuel by introducing the fuel through a further first nozzle coaxial to and arranged inside the first nozzle with an introduction velocity between 80 m/s and 130 m/s, for generating, when a temperature inside the combustion chamber is greater than a self-ignition temperature of the fuel, a flameless combustion downstream of the tubular body or for generating a flame detached from the tubular body.

18. The control method according to claim 15, further comprising, when a temperature inside the combustion chamber is greater than a self-ignition temperature of the fuel, interruption of the feeding the fuel through the at least one first nozzle and feeding the fuel by introducing the fuel through at least one pair of third fuel injection nozzles arranged radially outside the tubular body and substantially parallel to the longitudinal axis of the tubular body with an introduction velocity between 80 m/s and 130 m/s for generating a flameless combustion downstream of the tubular body.

19. A self-regenerating industrial burner comprising:
a head with which at least one first fuel injection nozzle, that can be associated at an inlet with a fuel supplying group, and at least one pair of second nozzles, that can be alternatively and selectively passed through by combustion air and combustion exhaust gases, are associated; and
a tubular body that has a longitudinal axis, is open at opposite ends and is arranged at a front part of the head and coaxial to the at least one first nozzle, the tubular body having an end close to the face of the head at which the first nozzle and the at least one pair of second nozzles come out or protrude and an opposite end distant from the face, wherein, when the burner is applied to a combustion chamber, or a chamber of an industrial furnace, the tubular body extends into the combustion chamber,
wherein each of the second nozzles comprises at least one first tubular portion, which radially lies outside the tubular body and at an end of which at least one first port is defined, the first port radially lying outside the tubular body and being alternatively for exit of the combustion air and for inlet of the exhaust combustion gases, wherein the tubular body comprises at least one radial opening passing through its lateral wall, wherein the at least one opening acts as an inlet for at least the combustion air exiting from one of the second nozzles of the at least one pair of second nozzles, or for at least one fraction thereof, into the tubular body where the combustion air mixes with fuel exiting from the at least one first nozzle, and wherein said first port at least partially faces a respective opening of said tubular body and wherein said first port is arranged at a distance from the longitudinal axis of said tubular body greater than the outer radius of said tubular body facing said first port.

* * * * *